F. H. CHEYNE.
SPEED VARYING TRANSMISSION.
APPLICATION FILED OCT. 4, 1912.

1,079,934.

Patented Dec. 2, 1913.
6 SHEETS—SHEET 3.

Fig. 5.

Witnesses
Frank A. Fahle
Josephine Gasper

Inventor
Frederick H. Cheyne,
By Arthur M. Hood
Attorney

F. H. CHEYNE.
SPEED VARYING TRANSMISSION.
APPLICATION FILED OCT. 4, 1912.

1,079,934.

Patented Dec. 2, 1913.
6 SHEETS—SHEET 4.

Witnesses
Frank A. Fuhle
Josephine Gasper

Inventor
Frederick H. Cheyne,
By Arthur M. Hood
Attorney

F. H. CHEYNE.
SPEED VARYING TRANSMISSION.
APPLICATION FILED OCT. 4, 1912.

1,079,934.

Patented Dec. 2, 1913.
6 SHEETS—SHEET 5.

Witnesses
Frank A. Fahle
Josephine Gasper

Inventor
Frederick H. Cheyne,
BY
Arthur M. Hood
Attorney

UNITED STATES PATENT OFFICE.

FREDERICK H. CHEYNE, OF INDIANAPOLIS, INDIANA.

SPEED-VARYING TRANSMISSION.

1,079,934.   Specification of Letters Patent.   Patented Dec. 2, 1913.

Application filed October 4, 1912. Serial No. 723,893.

*To all whom it may concern:*

Be it known that I, FREDERICK H. CHEYNE, a citizen of the United States, residing at Indianapolis, in the county of Marion and State of Indiana, have invented a new and useful Speed-Varying Transmission, of which the following is a specification.

It is the object of my invention to produce a speed varying transmission mechanism by which any desired speed variation between a driving member and a driven member may be obtained by a variation of circulation of a liquid, which is practically incompressible.

My present invention is primarily an improvement on and a simplification of that shown in my Patent No. 950,368 granted Feb. 22, 1910, and avoids the separate valves and valve chambers of such patent by interconnecting the pump cylinders and constructing the pistons thereof so that they serve also as control valves for the inlet and discharge of neighboring cylinders.

The invention also includes certain novel features in the control apparatus and in details of construction.

The accompanying drawings illustrate my invention.

In these drawings, Fig. 3 is a horizontal section on the line 3—3 of Fig. 2.

Figure 1:
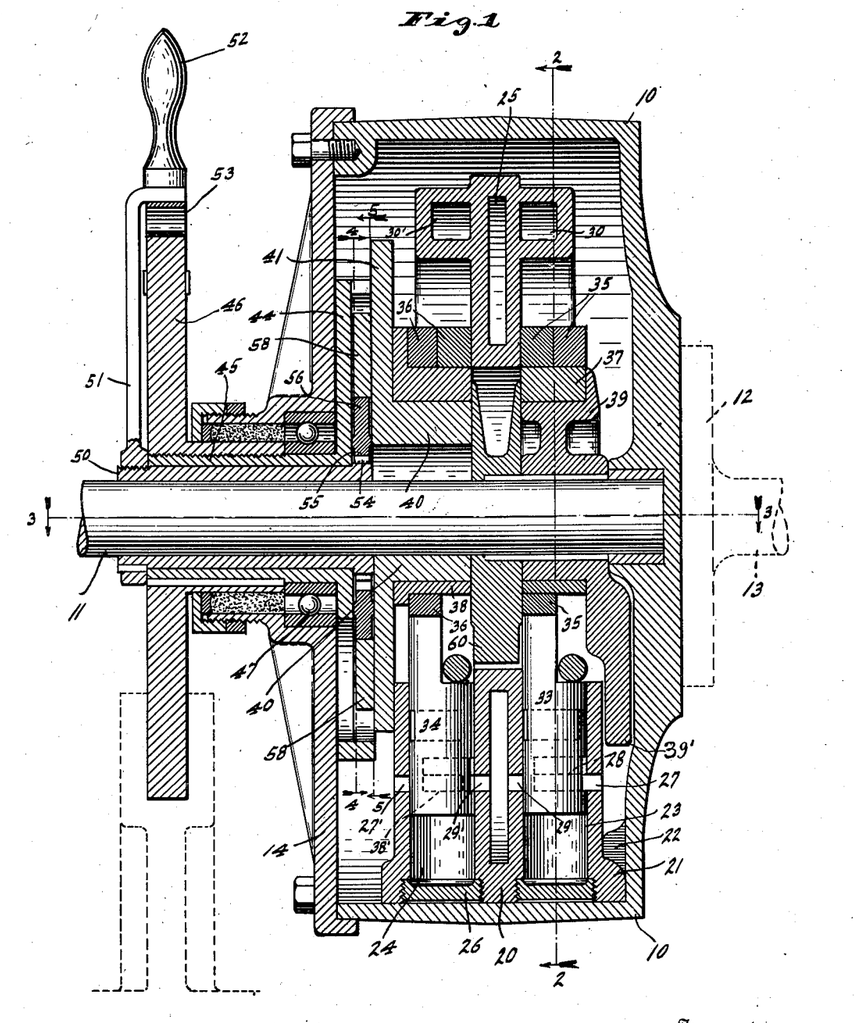
Figure 1 is a section, taken on the line 1—1 of Fig. 2, through a transmission mechanism embodying my invention.

The oil tight casing 10 is the driving member and the shaft 11 the driven member. The casing 10 may be crowned to receive power from a suitable belt, or may be connected in any other desired manner to a source of power, as by plate 12 and shaft 13 (dotted lines Fig. 1). The casing is closed at one end and forms a bearing for an end of the shaft 11, and may be closed at the other end by an oil-tight cap 14. A frame 20 is removably mounted within the casing 10, and is provided with lugs 21 which interlock with lugs 22 in the casing to prevent relative movement between the frame and casing when the frame is in place. The frame 20 has two sets of radially extending pump cylinders, one set being the motor cylinders 23 and the other set the measuring cylinders 24, and also has a closed annular chamber 25 between the two sets of pump cylinders. For convenience in manufacture, the outside ends of the pump cylinders may be closed by removable caps 26.

Figures 2, 7:
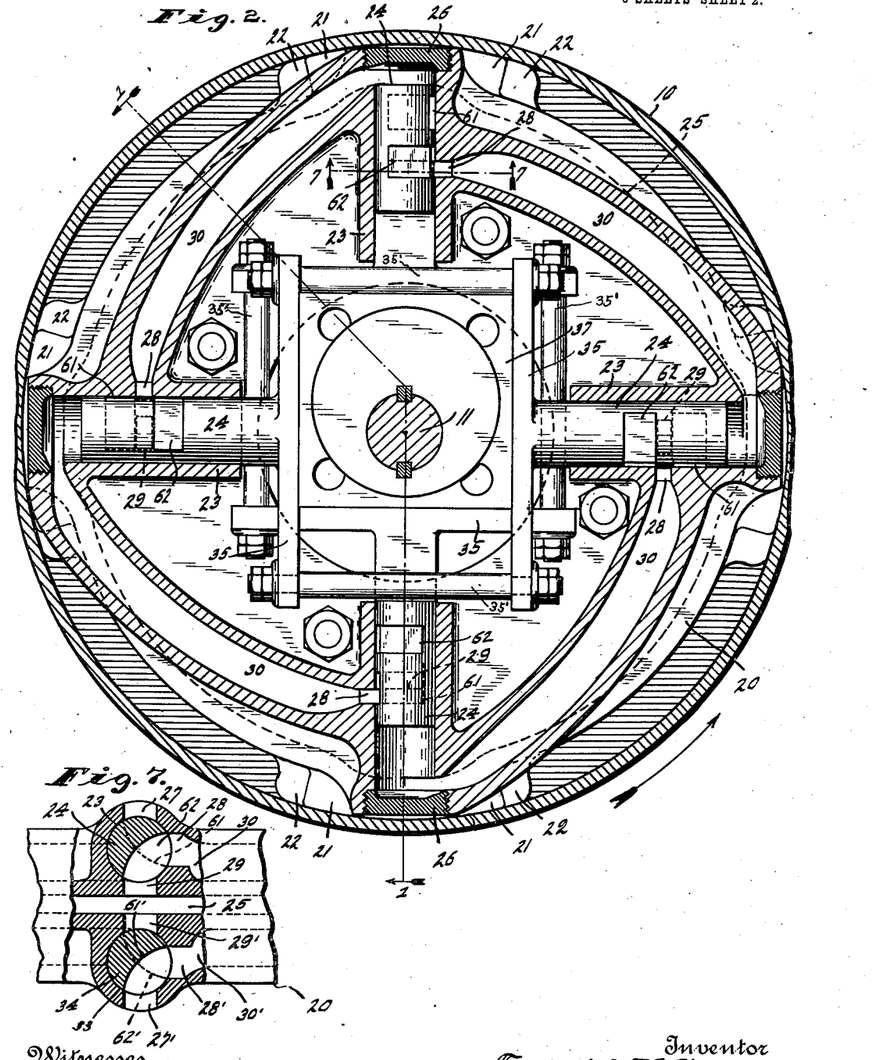
Fig. 2 is a section on the line 2—2 of Fig. 1.
Fig. 7 is a cross section on the line 7—7 of Fig. 2.

The cylinders 23 and 24 are open at their inner ends, and receive pistons 33 and 34 respectively. Each pair of diametrically opposite pistons 33 is mounted on a frame, within which may slide, transversely of the axis of such pistons, a cam block 37. The frame just mentioned is conveniently formed of cross bars 35, 35, which form a slide or guideway for the block 37, and connecting rods 35′, 35′ which are passed through the bars 35 and are threaded at their ends to receive clamping nuts as shown. Similarly, each pair of diametrically opposite pistons 34 is mounted on a frame 36 having the same built up construction as the frames 35—35′, within which may slide, transversely of the axis of such pistons, a cam block 38. In the arrangement illustrated, in which there are four cylinders 23 and four cylinders 24, there are two frames 35 35′ and two frames 36, the number of these frames varying with the number of cylinders used. In order that the cylinders and pistons of a set of pumps may be arranged in the same plane it is convenient to recess the pistons oppositely, as indicated in Fig. 2 so that the two frames 35—35, 35—35′, or 36, 36, may be closely associated side by side. Rotatable within the cam block 37 is an eccentric 39 keyed on the shaft 11, so that as such shaft and casing rotate relatively to each other the cam block 37 slides in the frames 35 35′ and moves such frames and their attached pistons 33 axially of the coöperating cylinders 23. Similarly, the cam block 38 slidingly fits on circular member 40, forming an adjustable eccentric, but this member 40 does not rotate with either the shaft 11 or the casing 10. Instead, in the arrangement shown in Figs. 1 to 7, it is provided with a flange 41, which is slidably mounted, conveniently by a dovetail tongue-and-groove connection 42 (see Fig. 3) on a governor head 44 carried by a sleeve 45 threaded into and keyed upon a stationary member 46 outside the casing 10. The sleeve 45 furnishes a support for a ball bearing 47 for the cap 14.

Within the sleeve 45 is a sleeve 50, to the outside end of which is rigidly fastened a lever 51 provided with an operating handle 52 at its end and with spring clamping fingers 53 which coöperate with the periphery of the disk 46 to lock the lever 51 against accidental displacement. Mounted on or integral with the inner end of the sleeve 50 is a gear 54, which coöperates with a rack 55 on a wedge 56 slidably mounted between the parts 41 and 42 so that it can slide in a direction at right angles to that in which the flange slides on the governor head 44. The wedge 56 is provided with inclined faces 57 which coöperate with wedge blocks 58 on the flange 41, so that as the handle 52 is turned in one direction or the other the gear 54 and rack 55 slide the wedge 56 horizontally across the governor head 44 and the coöperating faces 57 and wedge blocks 58 move the flange 41 and adjustable eccentric 40 vertically across the governor head. Thus the center of the adjustable eccentric may be made to coincide with or to move eccentric to the center of the shaft 11. This variable eccentricity of the surface of the member 40 determines the length of the stroke of the pistons 34.

A combined spacer and counterbalancer 60 spaces the parts 37 and 39 from the parts 38 and 40; and its loaded side, together with the eccentric weight 39' carried by the eccentric 39, substantially counterbalances the projecting parts of the eccentric 39 and the pistons 33.

In my prior patent, valve chambers and valves distinct from the pump cylinders and pistons were provided, but in my present construction I have eliminated these additional parts by forming the pistons and pump cylinders so that they will also perform the functions of controlling valves. Each cylinder may therefore be considered as comprising two portions, one of which will be the pump end and the other the valve end. These two parts will have their axes parallel, and most conveniently the axes will be coincident. In order to accomplish this result, I provide each of the cylinders 23, in the valve portions thereof, with three ports 27, 28, and 29. Port 27 forms a communication between the cylinder and the interior of the driving member 10. Port 28 communicates with a passage 30 which leads to the pump end of an adjacent cylinder 23. Port 29 forms a communication between the interior of the cylinder and the chamber 25. Similarly, each cylinder 24 is provided with ports 27', 28', and 29'; port 27' forming a communication between the cylinder and the interior of the driving member 10; port 28' communicating with a passage 30' which leads to the pump end of an adjacent cylinder 24; and port 29' forming a communication between the cylinder and the chamber 25. Each piston 33 is provided with two segmental grooves 61 and 62 which are so arranged and formed that groove 61 will intermittently connect ports 27 and 28, and groove 62 will intermittently (and in alternation with the action of the groove 61) connect ports 29 and 28. Similarly, each piston 34 is provided with segmental grooves 61' and 62' which alternately connect ports 27'—28' and ports 29'—28'. In the particular arrangement shown in the drawings, the grooves 61' and 62' are reversed in their arrangement as compared with the arrangement of grooves 61 and 62.

The operation of the apparatus is substantially the same as that of my prior device. Assume that the adjustable eccentric 40 is set with a sufficient eccentricity to give to the pistons 34 a stroke-volume equal to the stroke-volume of the pistons 33. If the casing 10 is rotated and rotation of the shaft 11 is resisted, reciprocation of both sets of pistons will result, and the number of reciprocations of both sets must equal the number of rotations of the casing 10. Oil will be drawn into the pump ends of cylinders 23 in succession, flowing into each cylinder 23 from the interior of casing 10 through the port 27, groove 61, and port 28 of an adjacent cylinder 25, and thence through the connecting passage 30; oil will also be forced from the pump ends of the cylinders 23 in succession, flowing from each cylinder 23 through the associated passage 30 and through the port 28, groove 62, and port 29 of the same adjacent cylinder as before, into the chamber 25. The oil thus forced from the cylinders 23 into the chamber 25 will be successively driven through the ports 29', grooves 62', ports 28', and passages 30' into the appropriate pump ends of cylinders 24, and such oil will be discharged from said cylinders in succession through passages 30', ports 28', grooves 61', and ports 27' into the interior of the casing 10. As the stroke-volume of pistons 34 has been assumed to be equal to the stroke-volume of pistons 33 it will be apparent that there will be a free circulation of oil from the interior of casing 10 through the motor pumps and thence into chamber 25; and thence through the measuring pumps back into casing 10. As a result, the shaft 11 will remain stationary.

If the length of stroke of the pistons 34 be reduced by a reduction of the eccentricity of the eccentric 40, the stroke-volume will be correspondingly reduced and a resistance to the free flow of oil through the apparatus as described will be presented;

however, as long as there is any eccentricity to the adjustable eccentric 40, the number of strokes of the pistons 34 remains exactly equal to the number of rotations of casing 10. Therefore, in order to provide for the smaller velocity of flow of oil through the apparatus there will have to be a reduction in the number of strokes of the pistons 33 because the length of stroke, and therefore the stroke-volume, of these pistons remains constant. This action results in the application of a torque upon the eccentric 39 and consequently upon the shaft 11, and causes such shaft to rotate at such a rate that its rotations are just sufficient to compensate for the difference between the stroke-volume of pistons 33 and the stroke volumes of pistons 34, and to make the amount of oil pumped by the pistons 33 just equal to that pumped by the pistons 34. By decreasing the eccentricity of the eccentric 40 the speed of the shaft 11 will be increased. As long as there is any eccentricity of the adjustable eccentric 40, the number of strokes of the pistons 34 will exactly equal the number of rotations of the casing 10; but when the eccentricity of such eccentric is reduced to zero, with relation to the shaft 11, all reciprocation of the pistons 34 ceases, and as there can then be no flow of oil through the pumps all movement of all parts in the casing 10, except of course the movement around the axis of the shaft 11, ceases; the parts are locked in relation with each other, and the shaft 11 rotates at the full speed of rotation of the casing 10.

Figures 4, 5, 6, 8:
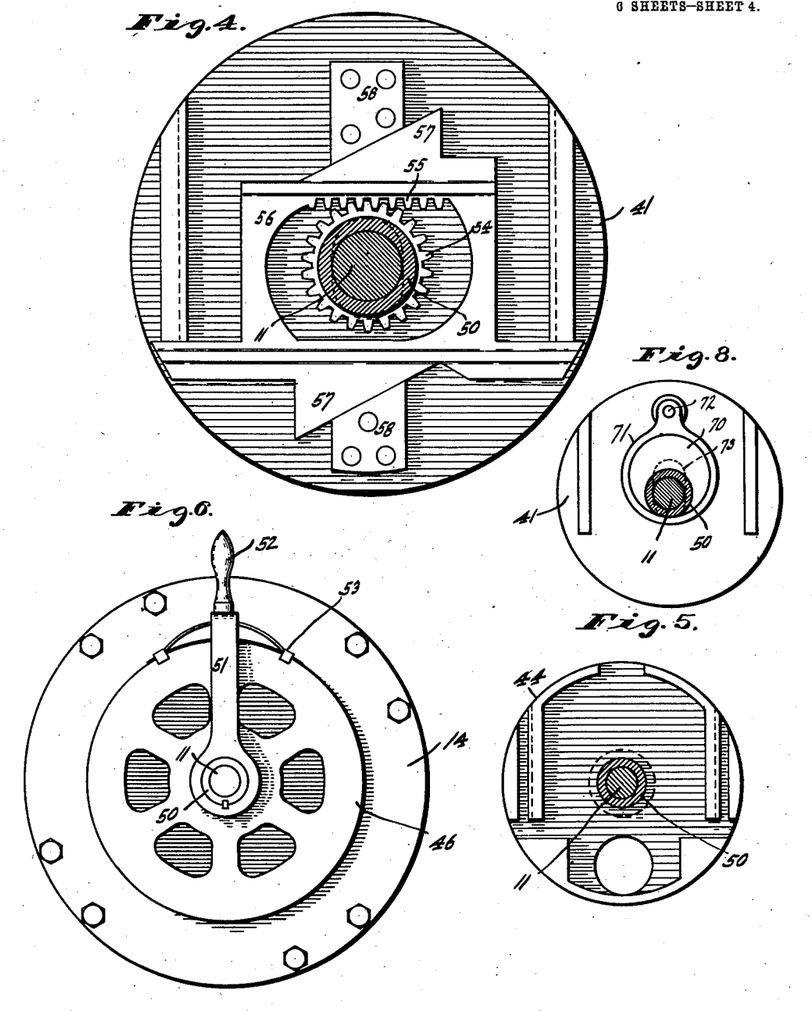
Fig. 4 is a section on the line 4—4 of Fig. 1, showing the governor cam and slide wedge.
Fig. 5 is a reduced section on the line 5—5 of Fig. 1, showing the governor head.
Fig. 6 is an end view of the device looking from the left in Fig. 1.
Fig. 8 is a view similar to Fig. 4, of a slight modification.
Figure 5:
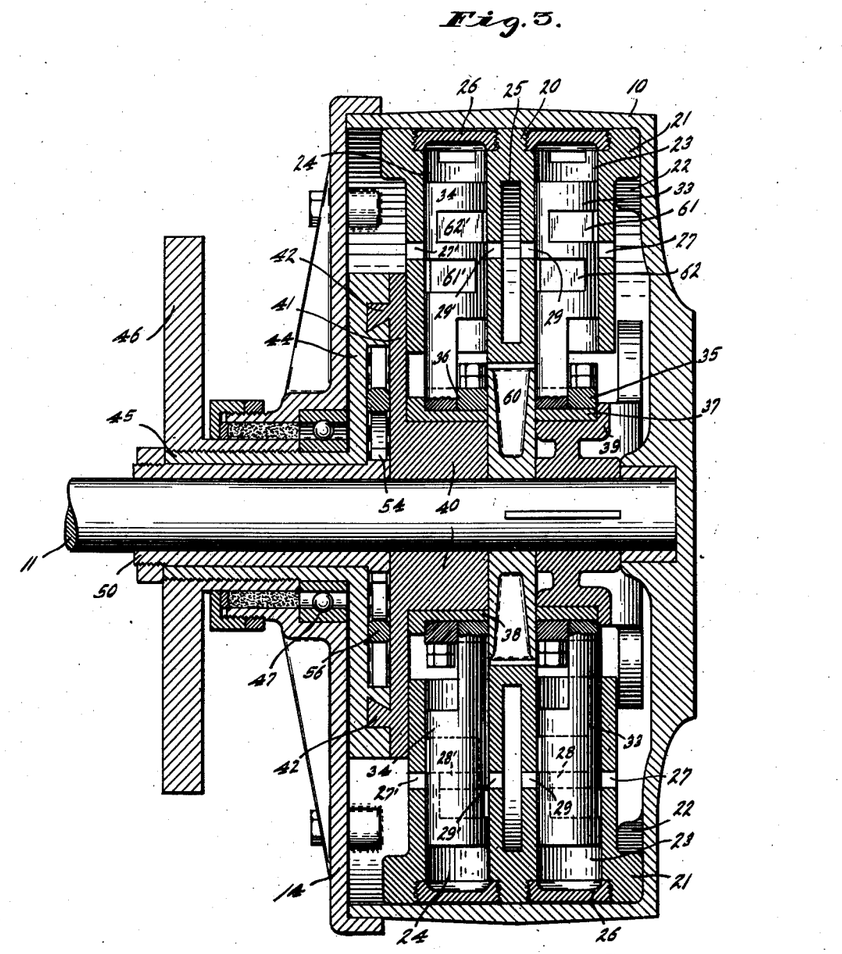

In the modification shown in Fig. 8, the adjusting movement of the flange 41 and the adjustable eccentric 40 carried thereby is obtained in a slightly different manner. Here the sleeve 50 carries at its inner end an eccentric 70, located in the same plane as the gear 54 in the arrangement shown in Fig. 1, and surrounding the eccentric 70 is a sliding collar 71 pivoted to the flange 41 at 72. By turning the sleeve 50, the flange 41 and the adjustable eccentric 40 are moved vertically along the governor head 44, the flange 41 being suitably grooved at 73 to allow this movement without binding on the shaft 11.

Figures 9, 10:
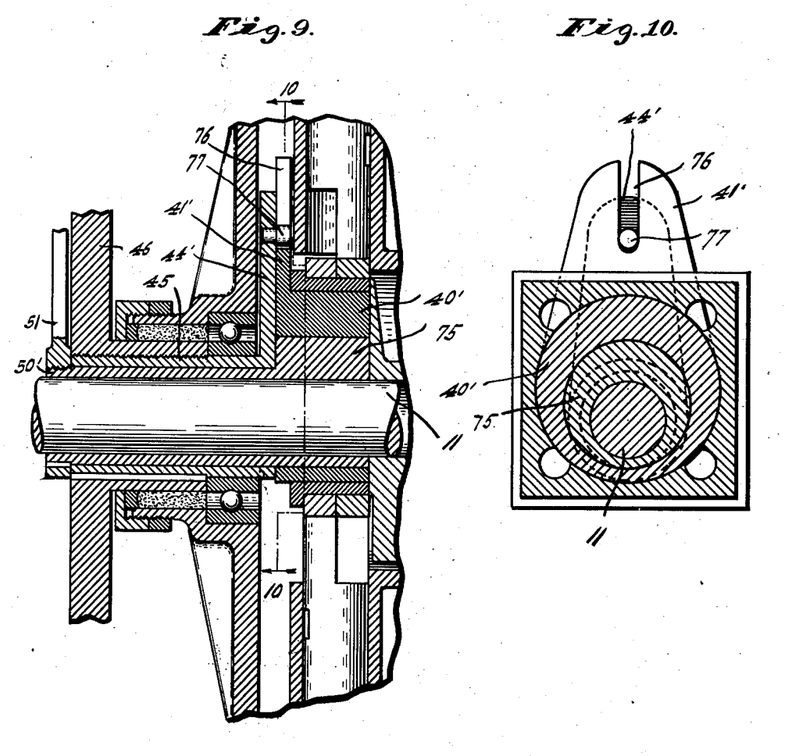
Fig. 9 is a fragmentary view somewhat similar to Fig. 2, but showing a modification.
Fig. 10 is a section on the line 10—10 of Fig. 9.
Figure 11:
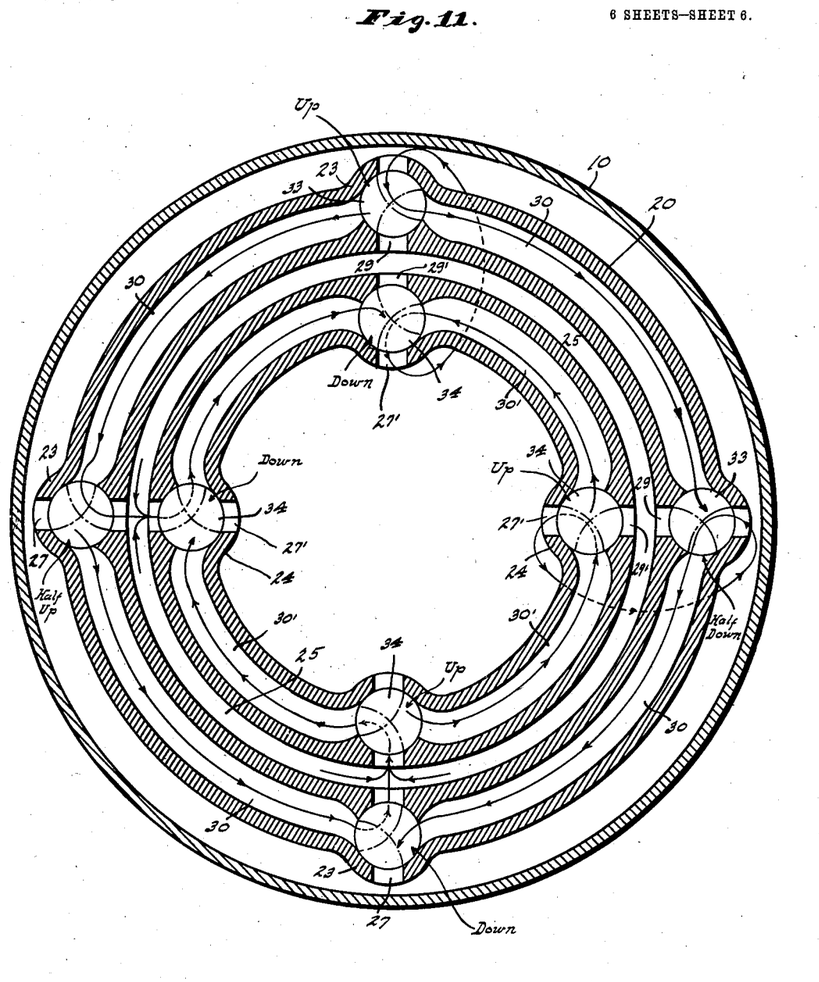
Fig. 11 a diagram indicating the valve arrangements and directions of flow.

Another modification of the means for adjusting the adjustable eccentric is shown in Figs. 9 and 10. Here the adjustable eccentric 40' is provided with eccentric inner and outer surfaces, and fitting inside of this adjustable eccentric is an eccentric 75 on the inner end of the sleeve 50'. The eccentricity between the inner and outer surfaces of the eccentric 40' is conveniently the same as the eccentricity of the eccentric 75, so that by moving the two eccentrics 40' and 75 relatively to each other the center of the outer surface of the adjustable eccentric 40' may be made to coincide with the axis of the shaft 11 or depart therefrom by any distance not exceeding the sum of the eccentricities between the inner and outer surfaces of the member 40' and the member 75. The adjustable eccentric 40' has a flange 41' slotted at 76 to fit over a pin 77 carried by the flange 44' of the stationary sleeve 45. By turning the handle 51, the eccentricity of the outer surface of the adjustable eccentric 40' may be varied, producing results exactly the same as in the other two modifications.

I claim as my invention:

1. The combination of a driving member, a driven member, and a normally stationary member, a set of fluid pumps of each of which one element is connected to the driving member and the other element to the driven member, a set of measuring pumps of each of which one element is connected to the driving member and the other to the stationary member, a chamber into which the first set of pumps discharge and which supplies the second set of pumps, and connecting passages between and through the elements of the different pumps whereby relative movement between the two elements of one pump directs the inlet and discharge of another pump.

2. The combination of a driving member, a driven member, and a normally stationary member, a set of fluid pumps of each of which one element is connected to the driving member and the other element to the driven member, a set of measuring pumps of each of which one element is connected to the driving member and the other to the stationary member, a chamber into which the first set of pumps discharge and which supplies the second set of pumps, connecting passages between and through the elements of the different pumps whereby relative movement between the two elements of one pump directs the inlet and discharge of another pump, and means for varying the position of said normally stationary member to control the relative movement between the elements of the second set of pumps.

3. The combination of two rotary members, a series of circumferentially arranged reciprocating pumps of each of which the elements are relatively movable by relative movement between said two rotary members, an adjustable, normally stationary member, a second series of circumferentially arranged reciprocating pumps of each of which one element moves with one of said rotary members and the two elements are relatively movable by relative movement between that rotary member and said stationary member, and means for adjusting said stationary member to vary the amount of relative movement of the elements of the last named pumps upon relative movement between the stationary member and the last named rotary member, and connecting passages between and through the elements of the different pumps whereby relative movement between the two elements of one pump directs the inlet and discharge of another pump.

4. The combination of a rotary liquid-tight casing, a shaft coaxial with said casing, a frame removably mounted in said casing, two sets of fluid pumps of each of which one element is formed in said frame, means on said shaft for producing relative movement between the elements of one of said sets of pumps upon relative rotation between said shaft and casing, a stationary member mounted within said casing, means for producing relative movement between the elements of the second set of pumps upon relative rotation between said casing and said stationary member, and means for adjusting said stationary member to vary the amount of movement between the elements of said second set of pumps, said second set of pumps receiving the discharge from the first set of pumps.

5. The combination of a rotary liquid-tight casing, a shaft coaxial with said casing, a frame removably mounted in said casing, two sets of fluid pumps of each of which one element is formed in said frame, means on said shaft for producing relative movement between the elements of one of said sets of pumps upon relative rotation between said shaft and casing, a stationary member mounted within said casing, and means for producing relative movement between the elements of the second set of pumps upon relative rotation between said casing and said stationary member, said second set of pumps receiving the discharge from the first set of pumps.

6. The combination of a rotary casing, a shaft coaxially mounted therein, two circumferential series of pumps of each of which pumps one element is fixed relatively to said casing, the second set of pumps receiving the discharge from the first set, an eccentric carried by said shaft and operating upon the second element of each of the pumps of the first series to produce relative motion between the elements of the pumps of said series upon relative rotation of the shaft and casing, a normally stationary circular member which coöperates with the second element of each of the pumps of the second series to produce relative movement between the elements of said pumps upon rotation of the casing, the amount of such relative movement depending upon the eccentricity of said stationary circular member, and means for varying the eccentricity of said stationary circular member, and connecting passages between and through the elements of the different pumps whereby relative movement between the two elements of one pump directs the inlet and discharge of another pump.

7. The combination of a rotary casing, a shaft coaxially mounted therein, two circumferential series of pumps of each of which pumps one element is fixed relatively to said casing, the second set of pumps receiving the discharge from the first set, an eccentric carried by said shaft and operating upon the second element of each of the pumps of the first series to produce relative motion between the elements of the pumps of said series upon relative rotation of the shaft and casing, and a normally stationary circular member which coöperates on the second element of each of the pumps of the second series to produce relative movement between the elements of said pumps upon rotation of the casing, the amount of such relative movement depending upon the eccentricity of said stationary circular member, and connecting passages between and through the elements of the different pumps whereby relative movement between the two elements of one pump directs the inlet and discharge of another pump.

8. The combination of a driving member and a driven member coaxial therewith, a set of fluid motor-pump cylinders and a set of fluid measuring-pump cylinders carried by the driving member, an eccentric carried by the driven member, pistons connected with said eccentric and mounted within the motor-pump cylinders, a stationary eccentric, means for varying the eccentricity of said stationary eccentric, pistons associated with said stationary eccentric and mounted within the measuring cylinders, inlet and exhaust passages and ports between the two sets of cylinders, and port-controlling means carried by the pistons, for the purpose set forth.

9. The combination of a driving member and a driven member coaxial therewith, a set of fluid motor-pump cylinders and a set of fluid measuring-pump cylinders carried by the driving member, an eccentric carried by the driven member, pistons connected with said eccentric and mounted within the motor-pump cylinders, a stationary eccentric, pistons associated with said stationary eccentric and mounted within the measuring cylinders, inlet and exhaust passages and ports between the two sets of cylinders, and port-controlling means carried by the pistons, for the purpose set forth.

10. The combination of a driving member and a driven member, a set of fluid motor-pump cylinders and a set of fluid measuring-pump cylinders carried by the driving member, an eccentric carried by the driven member, pistons connected with said eccentric and mounted within the motor-pump cylinders, a stationary eccentric, means for varying the eccentricity of said stationary eccentric, pistons associated with said stationary eccentric and mounted within the measuring cylinders, inlet and exhaust passages and ports between the two sets of cylinders, and port-controlling means carried by the pistons, for the purpose set forth.

11. The combination of a driving member and a driven member, a set of fluid motor-pump cylinders and a set of fluid measuring-pump cylinders carried by the driving member, an eccentric carried by the driven member, pistons connected with said eccentric and mounted within the motor-pump cylinders, a stationary eccentric, pistons associated with said stationary eccentric and mounted within the measuring cylinders, inlet and exhaust passages and ports between the two sets of cylinders, and port-controlling means carried by the pistons, for the purpose set forth.

12. The combination of two relatively rotatable members, a series of cylinders carried by one of said members, a plurality of pistons, one for each of said cylinders, connected to the other of said members so that by relative rotation between the two members the pistons are moved relative to their coöperating cylinders, means for adjusting the amount of relative movement between coöperating pistons and cylinders produced by relative rotation between said relatively rotatable members, connecting passages between the cylinders and coördinated with passages in the pistons whereby relative movement between one cylinder and its coöperating piston directs the inlet and discharge for another cylinder and piston.

13. The combination of two relatively rotatable members, a series of cylinders carried by one of said members, a plurality of pistons, one for each of said cylinders, connected to the other of said members so that by relative rotation between the two members the pistons are moved relative to their coöperating cylinders, and connecting passages between the cylinders and coördinated with passages in the pistons whereby relative movement between one cylinder and its coöperating piston directs the inlet and discharge for another cylinder and piston.

14. The combination of two relatively rotatable members, a circular series of cylinders rotatably-fixed relatively to one of said members, a plurality of pistons, one for each of said cylinders, said pistons being connected to the other of said members so that by relative rotation between the two members the pistons are moved relative to their coöperative cylinders, means for adjusting the amount of relative movement between coöperating pistons and cylinders produced by relative rotation between said relatively rotatable members, and connecting the passages between the cylinders and coördinated with passages in the pistons whereby relative movement between one cylinder and its coöperating piston controls the inlet and discharge for another cylinder and piston.

15. The combination of two relatively rotatable members, a circular series of cylinders rotatably-fixed relatively to one of said members, a plurality of pistons, one for each of said cylinders, said pistons being connected to the other of said members so that by relative rotation between the two members the pistons are moved relative to their coöperative cylinders, and connecting the passages between the cylinders and coördinated with passages in the pistons whereby relative movement between one cylinder and its coöperating piston controls the inlet and discharge for another cylinder.

In witness whereof, I have hereunto set my hand and seal at Indianapolis, Indiana, this first day of October, A. D. one thousand nine hundred and twelve.

FREDERICK H. CHEYNE. [L. S.]

Witnesses:
  G. B. SCHLEY,
  MAY LAYDEN.